Oct. 13, 1931.   J. BING   1,827,348
POWER TRANSMISSION DEVICE
Filed Aug. 8, 1928
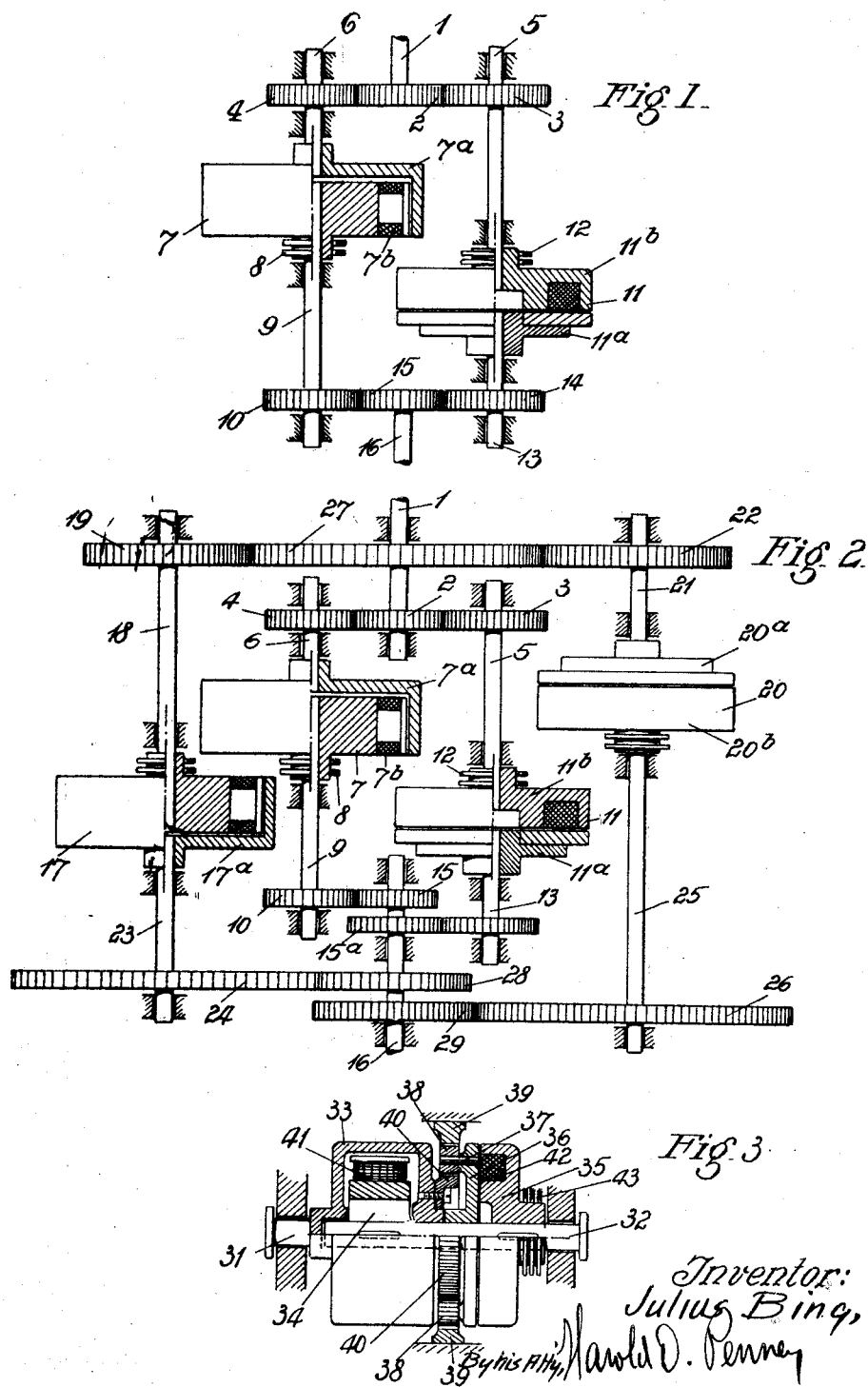
Inventor:
Julius Bing,
By his Atty. Harold D. Penney Patented Oct. 13, 1931

1,827,348

UNITED STATES PATENT OFFICE

JULIUS BING, OF EISENACH, GERMANY, ASSIGNOR TO THE FIRM MAGNETWERK G. M. B. H., EISENACH SPEZIALFABRIK FÜR ELEKTROMAGNET-APPARATE, OF EISENACH, THURINGIA, GERMANY

POWER TRANSMISSION DEVICE

Application filed August 8, 1928, Serial No. 298,206, and in Germany September 1, 1927.

My invention relates to power transmission devices, especially used for vehicles which are driven by Diesel-engines through the intermediary of change-speed-gears.

For the purpose of avoiding jerks in vehicles of the kind referred to, such as Diesel-locomotives, when throwing in the several speeds, and of relieving the friction clutch used for the control, I already proposed in my pending application of March 22nd 1928, Ser. No. 263,813, to start the drive of that member of the friction clutch which is connected with the driven shaft by means of an eddy-current clutch and to connect the said member of the friction clutch with the other friction member fixed to the driving shaft, as soon as the friction member on the driven shaft has attained the maximum number of revolutions corresponding to the speed which has been thrown in.

The object of my present invention is to improve the said controlling means in several respects. As through the slip of the eddy-current clutch the friction clutch member driven by the said eddy-current clutch is retarded relatively to the driving friction clutch member, a jerk, through a relatively slight one, occurs, when throwing in the friction clutch, and the main object of my present invention is the avoidance of any jerks. Further objects of my invention are the accommodation of the power transmission device to the confined space available in vehicles of the kind referred to and the provision of a compact construction warranting for the reliability which is necessary for the operation of vehicles of the kind referred to.

Other objects and features of my invention will appear from the following specification and from the accompanying drawings, in which three embodiments of the invention are illustrated.

The Fig. 1 is a schematic view of one embodiment of my invention, and the

Fig. 2 is a schematic view of a modified embodiment of my invention.

The Fig. 3 is a side elevation and a longitudinal section of a third embodiment of my invention. In the drawings corresponding reference numbers refer to corresponding parts in the several figures.

According to Fig. 1 the power transmission device has a driving or primary shaft 1 to which a toothed wheel 2 is keyed being in mesh with two other toothed wheels 3 and 4. The wheel 4 is fast on a shaft 6 to which the primary element 7ª or induction member of an eddy-current clutch 7 is keyed. The secondary eddy-current clutch element 7ᵇ or inductor member carries the exciting coils to which the exciting current is fed by means of slip rings 8. The said secondary element is fast on a shaft 9 to which a toothed wheel 10 is keyed. The toothed wheel 3 is fast on a shaft 5 to which the primary element 11ᵇ of an electromagnetic friction clutch 11 is keyed. The said primary friction clutch element carries the exciting coil to which the exciting current is fed by means of slip rings 12. The armature or the secondary element 11ª of this clutch is fast on a shaft 13 to which a toothed wheel 14 is keyed. The toothed wheels 10 and 14 are in mesh with a common toothed wheel 15 which is keyed to a shaft 16 being the driven or secondary shaft which is directly or through the intermediary of a change speed gear (not shown) connected with the traction wheels of the vehicle to transmit the power to the latter.

The toothed wheel 3 is of a larger diameter than the toothed wheel 4, so that the rotation of the shaft 5 is slower than that of the shaft 6. Due to the slip of the eddy-current clutch the rotation of the shaft 9 is slower than that of the shaft 6. The numbers of the teeth of the wheels 3 and 4 have to be proportioned in such a way that the shaft 5 has for a normal slip of the clutch 7 the same speed of rotation as the shaft 9.

The operation of the described transmission device is as follows: The number of revolutions of the shaft 1 may be 500 per minute and the slip of the eddy-current clutch about 15%. For starting the drive of the shaft 16 the exciting coil of the clutch 7 is energized. Correspondingly the shaft 9 is driven from the clutch with 425 revolutions per minute corresponding with the slip of the clutch. Due to the proportion of the numbers of teeth of the wheels 3 and 4 also the shaft 5 rotates substantially with the same speed. As the set of wheels 10, 15, 14 corresponds to the set of wheels 4, 2, 3, the armature 11ᵃ of the friction clutch will also have 425 revolutions per minute. Correspondingly there is no more any relative movement between the elements 11ᵃ and 11ᵇ. Now by energizing the exciting coil of the clutch member 11ᵇ the clutch is thrown in without any jerks. Thereby the friction coverings are much relieved, and as no large amount of heat has to be removed, the friction clutch may have small dimensions. Furthermore from a gear which may be joined to the shaft 16 in rear of the latter the injurious jerks are kept off which otherwise occur during the operation of the controlling means.

In Fig. 2 an embodiment of the invention is illustrated which provides for two different speeds. For the first speed the conditions are the same as in the first example, with the difference, that the gear wheel 14 is not in mesh with the gear wheel 15 of the shaft 16 but is in mesh with a special gear wheel 15ᵃ which is fast on the shaft 16. The number of teeth of the wheel 10 corresponds to that of the wheel 15 and the number of teeth of the wheel 14 to that of the wheel 15ᵃ. Between the numbers of teeth of the gear wheels 3 and 4 there is a difference which corresponds with the slip of the clutch 7.

For the second speed a second eddy-current clutch 17 and a second friction clutch 20 is provided. 17ᵃ is that element of the eddy-current clutch which is not provided with an exciting coil. The said element is fast on a shaft 23, whilst the other clutch element which carries the exciting coils is fast on a shaft 18 to which a toothed wheel 19 is keyed being in mesh with a second toothed wheel 27 which is fast on the shaft 1. The exciting element of the clutch 20 is fast on a shaft 25, and the other element 20ᵃ not being provided with an exciting coil is fast on a shaft 21 to which a toothed wheel 22 is keyed being in mesh with the wheel 27. To the shaft 23 a toothed wheel 24 is keyed which meshes with a third toothed wheel 28 being fast on the shaft 16 to which a fourth toothed wheel 29 is keyed being in mesh with a toothed wheel 26 which is keyed to the shaft 25.

The numbers of teeth of the wheels 19 and 22 may differ in accordance with the slip of the clutch 17. But the numbers of teeth of the said wheels, and this is also the case with the wheels 3 and 4, may also be equal, and provision of the transmission ratio corresponding with the slip of the eddy-current clutch may also be made between the toothed wheels 24 and 26 or 14 and 10 which drive the shaft 16. In the case of a speed of the driving shaft of 500 revolutions per minute, a slip of 15% and a corresponding speed of the shaft 23 of 425 revolutions the ratio of transmission between the wheels 24, 28, 29 and 26 must be such that the shaft 25 has 500 revolutions per minute. Finally the gear-ratio corresponding to the slip of the eddy-current clutch may be split up into two factors and provision for said factors be made with the gear wheels 19, 22 and 4, 3 for the one factor and with the gear wheels 24, 28, 29, 26 and 10, 15, 15ᵃ, 14 for the other factor, as indicated in Fig. 2.

The starting of the vehicle and the throwing in of the second speed is effected in the following way:

First of all the eddy current clutch 7 is thrown in by energizing its exciting coil, and the shaft 9 is put in motion which drives the shaft 16 through the intermediary of the gear wheels 10 and 15. As soon as the maximum speed has been reached the friction clutch 11 is thrown in and the eddy-current clutch thrown out. For changing the speed the eddy-current clutch 17 is thrown in. Thereby the toothed wheel 24 is accelerated which consequently drives the shaft 16 through the toothed wheel with the respective higher speed, and also the speed of the shaft 25 is correspondingly quickened through the intermediary of the toothed wheels 29 and 26. As soon as the shaft 23 has reached its maximum speed the clutch 20 is thrown in the elements 20ᵃ and 20ᵇ of which had the same speed. Through this clutch the entire power is now transmitted so that also the eddy-current clutch 17 may be thrown out.

The construction illustrated in Fig. 3 is for one speed only, and the several parts of the construction are built close together to decrease the space. 31 is the driving or primary shaft and 32 the driven or secondary shaft. The shaft 31 is fast with a casing 33 which encloses the exciting element 34 of the eddy-current clutch. The element 34 is keyed to the shaft 32. The free end of this shaft is mounted in the casing 33. The exciting element or magnet body 35 of the electromagnetic friction clutch is fast on the shaft 32. The armature 36 of the said friction clutch is rotatably mounted but axially movable on the shaft 32. The armature is provided with two bolts 37 on which two toothed wheels 38 are rotatably mounted which are both in mesh with the internal gear of a fast disc 39 and the external gear of a disc 40 which is rigidly connected with the casing 33 and therefore adapted to rotate in connection with the latter. The coil 41 of the eddy-current clutch and the coil 42 of the friction clutch are energized through the intermediary of the slip rings 43 on the shaft 32.

The operation of this transmission device corresponds with the operation of the device shown in Fig. 1. First of all the eddy-current clutch is energized. Due to the slip of this clutch the element 34 is retarded relatively to the element 33, and the magnet body 35 of the friction clutch is driven from the element 34 through the shaft 32 to which the said elements 34 and 35 are keyed. The number of teeth of the planetary gear 40, 38, 39 are in such relation that the armature element 36 of the friction clutch has the same speed as the exciting element or magnet body 35 so that in the moment in which the element 35 has attained its maximum speed, the friction clutch may be thrown in without the occurrence of jerks.

Besides the described embodiments of the invention other constructional forms are conceivable without deviating from the general character of the present invention, the most important feature of which consists in the combination of a yielding or electro-dynamic clutch with a positively acting or mechanical clutch and in the application between the said clutches of a connecting gear the ratio of which is such that the elements of the positively acting or mechanical clutch have substantially the same speed for a normal slip of the yielding or electro-dynamic clutch.

I claim:—

1. A power transmission device comprising a driving shaft, a driven shaft, two counter shafts each being in effective connection with said driving and said driven shaft, a transmission gear for positively connecting said counter shafts with said driving and driven shafts, an eddy-current clutch being intercalated in one of the said counter shafts and having a primary and a secondary member, mechanically engaging coupling means having a primary and a secondary member, both of such coupling means being adapted independently from each other to transmit power from the driving to the driven shaft, and transmission means adapted to impart to one member of said mechanically engaging coupling means a speed of rotation from one member of said yieldingly engaging coupling means substantially to an extent corresponding with the normal slip of said yieldingly engaging coupling means.

2. A power transmission device comprising a driving shaft, a driven shaft, two counter shafts each being in effective connection with said driving and said driven shaft, electro-dynamically engaging coupling means being intercalated in one of said countershafts and having a primary and a secondary member, mechanically engaging coupling means being intercalated in the other of said counter shafts and having a primary and a secondary member, both of said coupling means being adapted independently from each other to transmit power from the driving to the driven shaft and transmission means adapted to impart to the primary side of the said mechanically engaging coupling means a speed of rotation which is smaller than that of the primary member of the electro-dynamically engaging coupling means to an extent corresponding with the normal slip of said electro-dynamically engaging coupling means.

3. In a power transmission device the combination with a primary shaft, of a secondary shaft, an eddy-current clutch having two members, a mechanically engaging clutch having two members, one member of said eddy-current clutch being in a positive effective connection with said primary shaft, the other member of said eddy-current clutch being in a positive effective connection with said secondary shaft, one member of said mechanically engaging clutch being in a positive effective connection with one of said shafts, and a gear adapted positively to connect the other member of said mechanically engaging clutch with the other of said shafts and to impart to the members connected with each other a difference of speed which corresponds with the normal slip of the eddy-current clutch.

4. In a power transmission device the combination with two shafts, an eddy-current clutch having a casing-member and a coil-member, said casing-member being rigidly connected with one of said shafts, said coil-member being rigidly connected with the other one of said shafts, a friction clutch having two engaging members, one of said engaging members being rigidly connected with the other of said shafts, the other of said engaging members being loose on said other shaft, and a gear for the effective connection of said other engaging member with the said casing-member in such a way that these members have speeds of rotation which differ substantially to an extent corresponding with the normal slip of the eddy-current clutch.

5. A power transmission device comprising a driving shaft, a driven shaft, two counter shafts each being in effective connection with said driving and said driven shaft, electro-dynamically engaging coupling means being intercalated in one of said countershafts and having a primary and a secondary member, mechanically engaging coupling means being intercalated in the other of said counter shafts and having a primary and a secondary member, both of said coupling means being adapted independently from each other to transmit power from the driving to the driven shaft transmission means adapted to rotate the primary element of said positively engaging coupling means with a speed which is smaller than the speed of the primary element of the electro-dynamically engaging coupling means to an extent which substantially corresponds with the normal slip of the said electro-dynamically engaging coupling means, and transmission means to rotate the secondary element of the mechanically engaging coupling means with substantially the speed of the secondary element of the electro-dynamically engaging coupling means.

6. In a power transmission device a driving shaft, a driven shaft, electro-dynamically engaging coupling means having a primary and a secondary member, mechanically engaging coupling means having a primary and a secondary member, both of said coupling means being adapted independently from each other to transmit power from the driving to the driven shaft, and a gear adapted to impart to the secondary member of said mechanically engaging coupling means a speed of rotation which is smaller than that of the primary member of the electro-dynamically engaging coupling means to an extent substantially corresponding with the normal slip of the said eletro-dynamically engaging coupling means, said gear including a stationary internal gear and an external gear provided on the primary member of the electro-dynamically engaging coupling means, both of said gears meshing with at least one pinion being mounted on the secondary member of the mechanically engaging coupling means at a point remote from the axis of said coupling means.

7. In a power transmission device, two shafts, an eddy-current clutch consisting of a casing member and a coil-member, said casing member being rigidly connected with one of said shafts, said coil-member being rigidly connected with the other one of said shafts, a friction clutch having two engaging members, one of said engaging members being rigidly connected with the other of said shafts, the other of said engaging members being loose on said other shaft, and a gear for the effective connection of the said other engaging member with the said casing-member in such a way that the said members have speeds of rotation which differ substantially to an extent corresponding with the normal slip of the eddy-current clutch, said gear including a stationary internal gear and an external cogging provided on said casing-member, both of said gears meshing with at least one pinion being mounted on the loose member of the friction clutch at a point remote from the axis of said clutch.

8. A power transmission device comprising a driving shaft, a driven shaft, and two counter shafts; transmission gears for positively connecting said counter shafts with said driving and driven shafts, yieldingly engaging coupling means intercalated in one of the said counter shafts and having a primary and a secondary member, mechanically engaging coupling means intercalated in the other counter shaft and having a primary and a secondary member, both of such coupling means being adapted independently to transmit power from the driving to the driven shaft, and transmission means adapted to impart to one member of said mechanically engaging coupling means a speed of rotation from one member of said yieldingly engaging coupling means substantially to an extent corresponding with the normal slip of said yieldingly engaging coupling means.

9. A power transmission device comprising a driving shaft, a driven shaft, and two counter shafts, each being in operative connection with said driving and said driven shaft, an eddy-current clutch intercalated in one of the said counter shafts and having a primary and a secondary member, mechanically engaging coupling means having a primary and a secondary member, both of such coupling means being adapted independently from each other to transmit power from the driving to the driven shaft, and means adapted to impart to one member of said mechanically engaging coupling means a speed of rotation from one member of said eddy-current clutch substantially to an extent corresponding with the normal slip of said eddy-current clutch.

10. A power transmission device comprising a driving shaft, a driven shaft, and two counter shafts, each being in operative connection with said driving and said driven shaft, electro-dynamically engaging coupling means intercalated in one of said counter-shafts and having a primary and a secondary member, frictionally engaging coupling means intercalated in the other of said counter shafts and having a primary and a secondary member, both of said coupling means being adapted independently from each other to transmit power from the driving to the driven shaft, and transmission means adapted to impart to the primary side of the said frictionally engaging coupling means a speed of rotation which is smaller than that of the primary member of the electro-dynamically engaging coupling means to an extent corresponding with the normal slip of said electro-dynamically engaging coupling means.

11. In a power transmission device the combination with a primary shaft, of a secondary shaft, an eddy-current clutch having two members, a mechanically engaging clutch having two members, one member of said eddy-current clutch being in a positive operative connection with said primary shaft, the other member of said eddy-current clutch being in a positive operative connection with said secondary shaft, one member of said mechanically engaging clutch being in positive operative connection with one of said shafts, and a gear train adapted positively to connect the other member of said mechanically engaging clutch with the other of said shafts and to impart to the said parts connected with each other a difference of speed which corresponds with the normal slip of the eddy-current clutch.

12. A power transmission device comprising a driving shaft, a driven shaft, two counter shafts each being in effective connection with said driving and said driven shaft, electro-dynamically engaging coupling means being intercalated in one of said countershafts and having a primary and a secondary member, mechanically engaging coupling means being intercalated in the other of said counter shafts and having a primary and a secondary member, both of said coupling means being adapted independently from each other to transmit power from the driving to the driven shaft, transmission means adapted to rotate the primary element of said mechanically engaging coupling means with a speed which is lower than the speed of the primary element of the electro-dynamically engaging coupling means to an extent which substantially corresponds with the normal slip of the said electro-dynamically engaging coupling means, and transmission means to rotate the secondary element of the mechanically engaging coupling means with substantially the speed of the secondary element of the electro-dynamically engaging coupling means.

In testimony whereof I affix my signature.

JULIUS BING.